3,381,043
PREPARATION OF TELOMERS OF
TETRAFLUOROETHYLENE
Hugh Leithead Roberts, Winnington, Northwich, England,
assignor to Imperial Chemical Industries Limited, London, England, a corporation of Great Britain
No Drawing. Filed Mar. 9, 1964, Ser. No. 350,570
Claims priority, application Great Britain, Mar. 20, 1963,
11,052/63
3 Claims. (Cl. 260—653.1)

ABSTRACT OF THE DISCLOSURE

Telomers of tetrafluoroethylene having the empirical formula $Cl(C_2F_4)_nCl$ where $n$ is an integer from 1 to 5 are made by heating tetrafluoroethylene with phosphorus pentachloride at 100° C. to 200° C. under autogenous pressure, for example 20 to 75 atmospheres for several hours. It is convenient to carry out the reaction in an inert solvent, for example carbon tetrachloride, and it is preferable to separate the individual telomers by gas-chromatography. When the molar ratio of tetrafluoroethylene to phosphorus pentachloride in the reaction mixture is from 1:1 to about 5:1 most of the products have values of $n$ from 1 to 4. When the ratio rises to about 12:1 products for which $n$ is 5 or more predominate.

---

This invention relates to a process for making telomers of tetrafluoroethylene having the general formula $$Cl(C_2F_4)_nCl$$

where $n$ is an integer having a value of 1 or more.

It is known that tetrafluoroethylene can form telomers with various telogens, for example methyl iodide, sulphur chloride pentafluoride and methyl alcohol. These telomers usually possess limited stability; thus if the telogen is methyl iodide the relatively weak carbon-iodine bond, which permits the telomerisation reaction to proceed, is present in the final telomer and thus confers instability. An inorganic telogen like sulphur chloride pentafluoride has some advantages in that the sulphur-chlorine bond, which breaks to permit telomerisation, is replaced in the telomer by stronger sulphur-carbon and carbon-chlorine bonds. Even so the pentafluorothio group is less stable than the telomer chain.

We have now found that the stable telomers having the formula $Cl(C_2F_4)_nCl$ can be obtained by a simple reaction between phosphorus pentachloride and tetrafluoroethylene.

According to our invention we provide a process for making telomers of tetrafluoroethylene having the general formula $Cl(C_2F_4)_nCl$, where $n$ is an integer equal to one or more, comprising heating tetrafluoroethylene with phosphorus pentachloride under moderately elevated pressure, and under anhydrous conditions.

The reaction proceeds according to the equation $$PCl_5 + nC_2F_4 \rightarrow Cl(C_2F_4)_nCl + PCl_3$$

and not according to the alternative possibility expressed by the equation $$PCl_5 + C_2F_4 \rightarrow PCl_4 \cdot C_2F_4 \cdot Cl$$

Chlorine as such cannot be used to make the $Cl(C_2F_4)_nCl$ telomers because the sole product of the reaction between chlorine and tetrafluoroethylene is the monotelomer $ClC_2F_4Cl$ that is the known compound 1,1,2,2-tetrafluoro 1,2-dichloroethane. The reaction with chlorine is too vigorous to give the higher telomers and what is needed is a milder chlorinating agent like phosphorus pentachloride. It is probable that other mild chlorinating agents, for example antimony pentachloride and stannic chloride, could react in the way phosphorus pentachloride does.

Since phosphorus pentachloride is a solid it is preferable to carry out the reaction in an anhydrous liquid medium that can act as a solvent for the reactants, for example carbon tetrachloride.

The temperature at which the telomerisation reaction is carried out is from 100° to 200° C. The pressure is conveniently the autogenous pressure generated when the reaction mixture is heated in a sealed vessel; this is generally from 20 to 75 atmospheres.

Increasing the proportion of tetrafluoroethylene to phosphorus pentachloride in the reaction mixture encourages the formation of the higher telomers in which $n$ is 4 or more; increasing the proportion of phosphorus pentachloride favours the formation of lower telomers among which are known refrigerants and propellants. Any given reaction mixture can produce a range of telomers, but broadly speaking when the number of moles of tetrafluoroethylene per mole of phosphorus pentachloride is from about 1.0 to 5.0 the telomers in which $n$ is from 1 to 4 constitute from about 70% to 60% of the reaction products; when the number is from about 12 to 15 the proportion of telomers in which $n$ is 5 and more is 70% to 80% and it rises above 80% when the molar ratio $C_2F_4/PCl_5$ is greater than 16.

In one way of separating the telomers from the reaction products the monotelomer, which is gaseous above about 3° C. under atmospheric pressure, is separated first leaving a mixture of liquid telomers, carbon tetrachloride and phosphorus chlorides. The mixture is washed with a dilute aqueous solution of an alkali to neutralise any acidity and to remove phosphorus chlorides, after which the non-aqueous layer is removed and dried. It is then conveniently separated into individual telomers or groups of telomers by means of gas-chromatography using for example a column of firebrick impregnated with a silicone grease. Fractional distillations can be used to separate some of the telomers particularly those in which $n$ is greater than 4, but for separation as a whole fractional distillation is inconvenient owing to the formation of an azeotrope boiling at 76° C. between the tritelomer and carbon tetrachloride.

The invention is illustrated by the following examples.

EXAMPLE 1

Tetrafluoroethylene (70 g.), phosphorus pentachloride (70 g.) and carbon tetrachloride (70 g.) were charged into a stainless steel autoclave, which was then heated so that the mixture reacted at 160°–170° C. and the maximum pressure reached was 950 lb./sq. inch gauge. The pressure gradually fell away to 280 lb./sq. inch gauge as the reaction proceeded over five hours. The gaseous products consisted of 16 g. $Cl \cdot C_2F_4 \cdot Cl$ B.P. 3° C.; the solids consisted of 8 g. of unreacted phosphorus pentachloride, and the liquid products, which were separated by gas-chromatography, amounted to 175 g. and included $Cl(C_2F_4)_2Cl$, $Cl(C_2F_4)_3Cl$ and compounds of higher boiling point considered to be $Cl(C_2F_4)_nCl$ where $n$ is 4 and more. Some unreacted carbon tetrachloride was present together with phosphorus trichloride and also a small quantity of the telomer $CCl_3(C_2F_4)Cl$. The ditelomer $Cl(C_2F_4)_2Cl$ was identified by comparison of its infra-red absorption spectrum with that of an authentic sample. Analysis of the tritelomer $Cl(C_2F_4)_3Cl$ gave C, 18.9%; F, 59.5%; Cl, 20.7%; theoretical requirements are C, 19.3% ;F, 61.5%; Cl, 19.6%.

EXAMPLES 2-7

These examples, summarised in the table, relate to six experiments designed to show the effect of varying the weight ratio of phosphorus pentachloride to tetrafluoroethylene in the reaction mixture. All six were carried out in a closed stainless steel autoclave having an internal volume of approximately one litre, and in each case the weight of the reaction solvent carbon tetrachloride was 180 g., the reaction temperature was 170°–180° C., and the reaction pressure was the autogenous pressure developed, being between 40 and 60 atmospheres. The reaction time was six hours after which the autoclave was opened, the gaseous monotelomer $Cl(C_2F_4)Cl$ separated, and then the liquid products separated and washed with a 5% solution of sodium carbonate to remove phosphorus chlorides. The liquid products were then dried and separated by gas-chromatography at 80° C. using a column of firebrick impregnated with silicone grease. Simple fractional distillation does not give good separation of the telomers because carbon tetrachloride and the tritelomer, $Cl(C_2F_4)_3Cl$, form an azeotrope boiling at 76° C. and containing 9% of the latter compound. In the table mono-, di-, tri-, tetra-, and higher refer to the telomers $Cl(C_2F_4)_nCl$ in which $n$ is respectively 1, 2, 3, 4 and 5 or more.

| Experiment | Wt. in g. of reactants | | Wt. in g. of telomers $Cl(C_2F_4)_nCl$ | | | | |
|---|---|---|---|---|---|---|---|
| | $PCl_5$ | $C_2F_4$ | Mono- | Di- | Tri- | Tetra- | Higher |
| 1 | 210 | 169 | 98 | 26 | 11 | 12 | 40 |
| 2 | 210 | 202 | 80 | 32 | 24 | 13 | 33 |
| 3 | 207 | 333 | 68 | 63 | 36 | 27 | 96 |
| 4 | 144 | 326 | 45 | 27 | 38 | 44 | 83 |
| 5 | 55 | 404 | 12 | 4 | 9 | 14 | 98 |
| 6 | 50 | 382 | 6 | 6 | 12 | 12 | 103 |

What I claim is:

1. A process for making telomers of tetrafluoroethylene having the general formula $Cl(C_2F_4)_nCl$, where $n$ is an integer of from 1 to 5, comprising heating tetrafluoroethylene with phosphorus pentachloride at a temperature of from 100° to 200° C. and a pressure of from 20 to 75 atmospheres under anhydrous conditions, and subsequently separating the telomers from the reaction products.

2. A process as claimed in claim 1 in which the molar ratio of tetrafluoroethylene to phosphorus pentachloride in the mixture of reactants is from one to five.

3. A process as claimed in claim 1 in which the molar ratio of tetrafluoroethylene to phosphorus pentachloride in the mixture of reactants is at least from 12 to 15.

References Cited

UNITED STATES PATENTS 2,915,552  12/1959  Barnhart et al. _____ 260—653

DANIEL D. HORWITZ, *Primary Examiner.*